United States Patent [19]
Abe et al.

[11] Patent Number: 5,329,067
[45] Date of Patent: Jul. 12, 1994

[54] STRUCTURE FOR FIXING OPTICAL CABLE HOLDING BOX TO PRINTED CIRCUIT BOARD

[75] Inventors: Hiroyuki Abe; Masatomo Ohta; Masahiro Haga; Shigeki Yamaji; Shin Watanabe, all of Kawasaki, Japan

[73] Assignee: Fujitsu Limited, Kawasaki, Japan

[21] Appl. No.: 74,661

[22] Filed: Jun. 10, 1993

[30] Foreign Application Priority Data

Jun. 15, 1992 [JP] Japan .................................. 4-154673

[51] Int. Cl.[5] .......................... H05K 1/18; H05K 7/02
[52] U.S. Cl. .................................... 174/260; 174/250; 174/255; 361/760; 428/901; 428/209; 428/192; 385/135; 385/134
[58] Field of Search ................. 385/135, 134; 174/250, 174/255, 260; 361/760, 752; 428/901, 209, 192

[56] References Cited

U.S. PATENT DOCUMENTS

| | | | |
|---|---|---|---|
| 4,941,720 | 7/1989 | Barwig et al. | 350/96.2 |
| 4,998,577 | 1/1991 | Jamieson | 428/573 |
| 5,189,724 | 2/1993 | Hartley | 385/135 |
| 5,198,279 | 3/1993 | Beinhaur et al. | 428/99 |
| 5,222,183 | 6/1993 | Daems et al. | 385/135 |
| 5,259,051 | 11/1993 | Burack et al. | 385/76 |

Primary Examiner—Leo P. Picard
Assistant Examiner—L. Thomas
Attorney, Agent, or Firm—Armstrong, Westerman, Hattori, McLeland & Naughton

[57] ABSTRACT

A structure for fixing an optical cable holding box to a printed circuit board whereby the fixed position of the optical cable holding box can be changed at will and occurrence of warping in the printed circuit board can be effectively prevented. A pair of extended first metal plates having a plurality of screw holes formed therein at equal spaces are fixed to the printed circuit board in the vicinity of its upper and lower edge portions along the upper and lower edges. A pair of vertically extended second metal plates having a plurality of screw holes formed therein at equal spaces are securely fixed to the pair of first metal plates with screws such that they are stretched between the first metal plates and spaced apart a predetermined distance from each other. Thereupon, the optical cable holding box is securely fixed with screws to the pair of second metal plates in a desired position.

2 Claims, 4 Drawing Sheets

STRUCTURE FOR FIXING OPTICAL CABLE HOLDING BOX TO PRINTED CIRCUIT BOARD

BACKGROUND OF THE INVENTION

1. Field of the Invention

The present invention relates to a structure for fixing an optical cable holding box to a printed circuit board, also serving for the purpose of preventing occurrence of warping in a large-sized printed circuit board.

2. Description of the Related Art

With the development in recent years of multifunctional transmission apparatus, there are demands for larger-sized printed circuit boards to be mounted in the apparatus. Therefore, production of transmission apparatuses using large-sized printed circuit boards are intensively carried on. However, during the solder dipping process, warping of the printed circuit board becomes more liable to occur the larger in size the printed circuit board is. Therefore, there arises the need for a countermeasure to prevent occurrence of warping in the large-sized printed circuit board. Further, optical transmission systems having large transmission capacity and fitted for high speed transmission are prevalent among transmission systems in use recent years. Hence, there arises the need for holding the excess-length portion of an optical cable in a desired position of the printed circuit board.

FIG. 1 shows a plan view of a conventional art example in which a countermeasure is taken to prevent occurrence of warping in a large-sized printed circuit board. There are provided a pair of horizontally extended (in X direction) warp preventing metal plates 3 fixed to the large-sized printed circuit board 2 in the vicinity of its upper and lower edge portions along the upper and lower edges. On the printed circuit board 2, there are mounted a plurality of electronic parts 4 and an optical module 5. The optical module 5 is connected with an optical cable 6 and the excess-length portion of the optical cable 6 is held in a predetermined position on the large-sized printed circuit board 2 by means of a protection cover 7. Reference numeral 8 denotes a connector.

In the fabrication of large-sized printed circuit boards hitherto in practice, the board with two warp-preventing metal plates 3, extended in X direction, fixed thereto at its upper and lower portions, as shown in FIG. 1, has been dipped in a solder bath. However, since the board is not provided with the warp-preventing metal plates in Y direction (vertical direction), there has been a problem that warping occurs in the vertical direction. Once a warp is formed in the printed circuit board, such trouble becomes liable to occur that the printed circuit board, when inserted into a shelf, does not fit well into the guide groove or the printed circuit board comes into contact with an adjoining printed circuit board.

Further, since the optical cable has so far been held in place by means of the protection cover, it has been unable to mount a part on the portion where the protection cover is fixed and, hence, there has been a problem that the area for holding the excess-length portion of the optical cable therein is fixated. Also when there were provided conditions for mounting parts on the printed circuit board, it has been unable to change at will the holding position of the excess-length portion of the optical cable.

SUMMARY OF THE INVENTION

Accordingly, an object of the present invention is to provide a structure for fixing an optical cable holding box to a printed circuit board in which the fixed position of the optical cable holding box can be changed at will.

Another object of the present invention is to provide a structure of a printed circuit board whereby warping of the printed circuit board during the manufacturing process thereof is prevented from occurring.

In accordance with an aspect of the present invention, there is provided a structure for fixing an optical cable holding box to a printed circuit board comprising: a printed circuit board; a pair of extended first metal plates fixed to the printed circuit board in the vicinity of its upper and lower edge portions along the upper and lower edges, the first metal plate having a plurality of screw holes formed therein at equal spaces; a pair of extended second metal plates fixed to the pair of first metal plates such that they are stretched between the first metal plates and spaced apart from each other, the second metal plate having a plurality of screw holes formed therein at equal spaces; a plurality of first screws for removably fixing the second metal plates to the first metal plates; an optical cable holding box fixed to the pair of second metal plates; and a plurality of second screws for removably fixing the optical cable holding box to the second metal plates.

According to the present invention, when a printed circuit board is to be dipped in a solder bath, the second metal plates are fixed in the vicinity of the left-hand and right-hand edges of the printed circuit board and then the printed circuit board is dipped in the solder bath so that soldering for the parts is achieved. Thus, warping of the printed circuit board during the dip soldering is prevented from occurring.

After the dip soldering has been finished, the second metal plates are securely fixed in appropriate positions of the first metal plates and then the optical cable holding box is securely fixed in appropriate positions of the second metal plates with screws. Thereby, even when the mounting conditions of parts were provided or when it is difficult to obtain a place for holding the optical cable on the printed circuit board because high-density part mounting was carried out, it is made possible to hold the optical cable in the optical cable holding box for protection thereof in any desired position.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
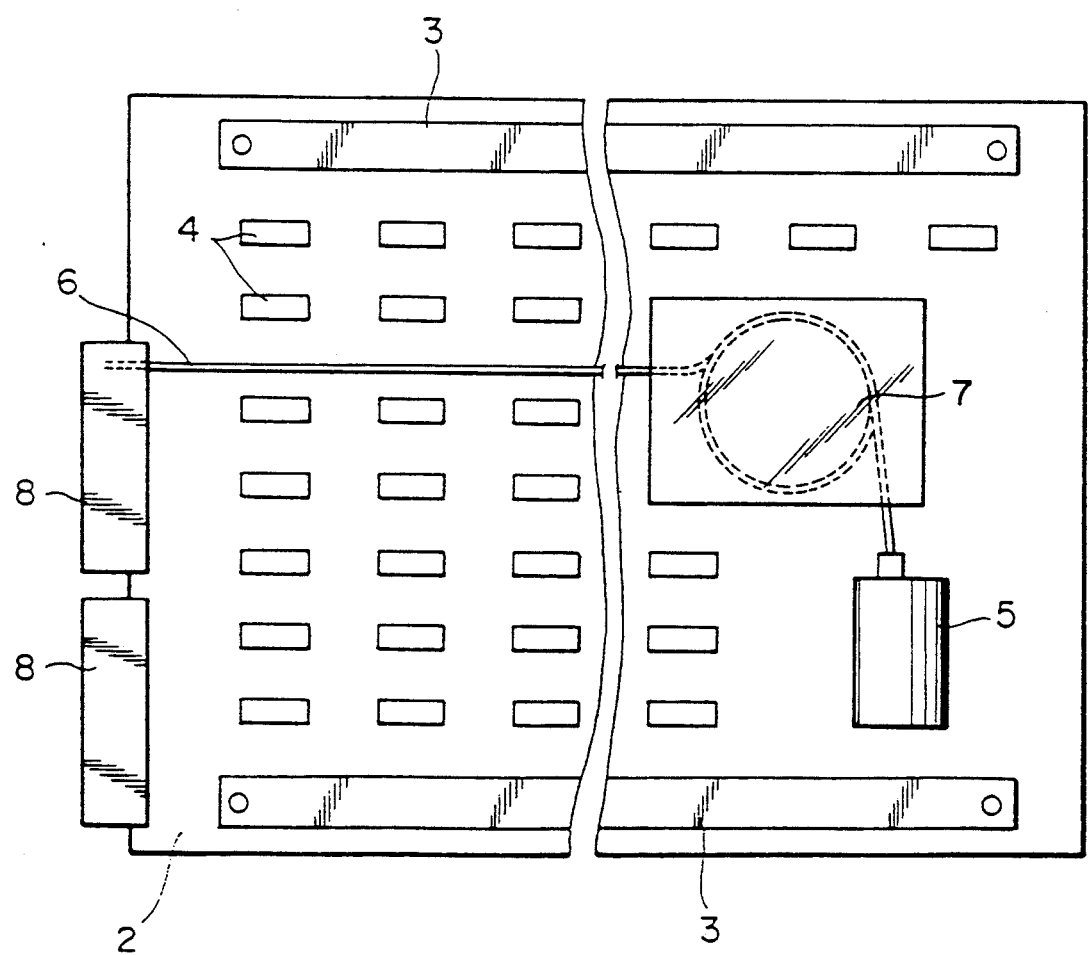
FIG. 1 is a plan view showing a conventional optical cable holding structure provided on a printed circuit board.
Figure 2:
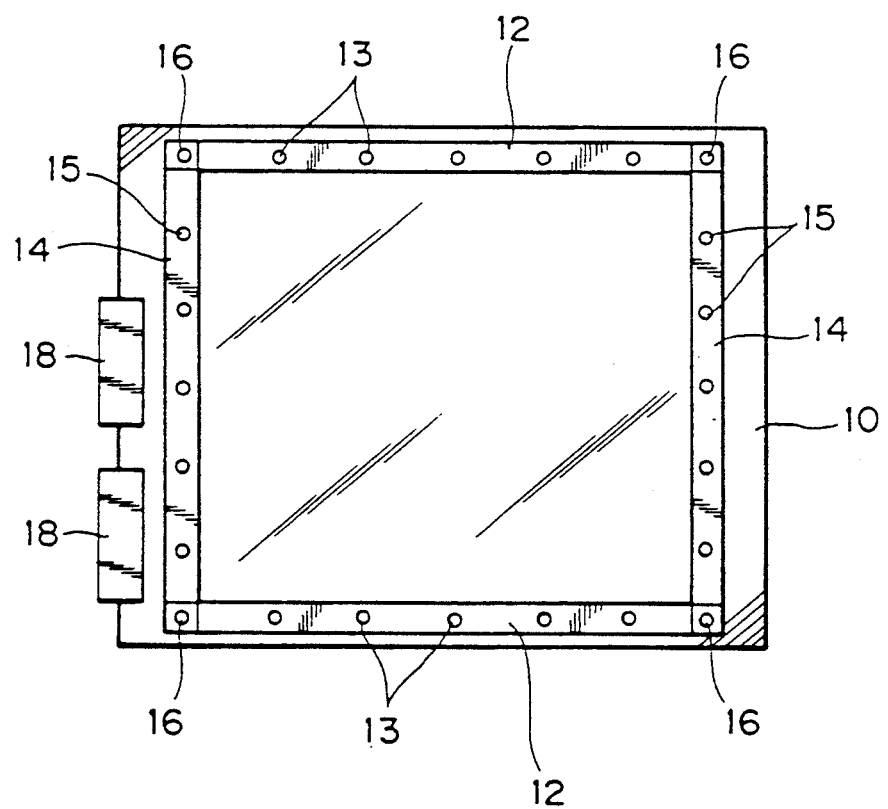
FIG. 2 is a schematic diagram of a method of fixing warp-preventing metal plates to a printed circuit board when the same is dip soldered in an embodiment of the present invention.

Referring to FIG. 2, there is shown a manner of fixing some warp preventing metal plates to a printed circuit board, which prevent the board from warping while it is dipped in a solder bath. In this case, a pair of warp preventing first metal plates 12 are fixed in the vicinity of the upper and lower edges of the printed circuit board 10 such that they are extended in the horizontal direction (X direction) along the upper and lower edges. The first metal plate 12 is provided with a plurality of screw holes 13 formed therein at equal spaces. Further, a pair of warp preventing second metal plates 14 are fixed to both left and right ends of the first metal plates 12 with screws 16 such that they are extended in the vertical direction (Y direction). The second metal plate 14, like the first metal plate 12, is provided with a plurality of screw holes 15 formed therein at equal spaces. In concrete terms, iron plates about 3 mm thick are suitable for the first and second metal plates.

After fixing the first metal plates 12 and second metal plates 14 to the printed circuit board 10 in the above described manner, the printed circuit board 10 is dipped in a solder bath and thereby soldering for the parts mounted on the printed circuit board 10 is achieved. By means of the warp preventing first and second metal plates 12 and 14, the large-sized printed circuit board 10, liable to warp when dip soldered, is effectively prevented from warping. Reference numeral 18 denotes a connector for connecting the printed circuit board 10 to a back wiring board or the like.

Figure 3:
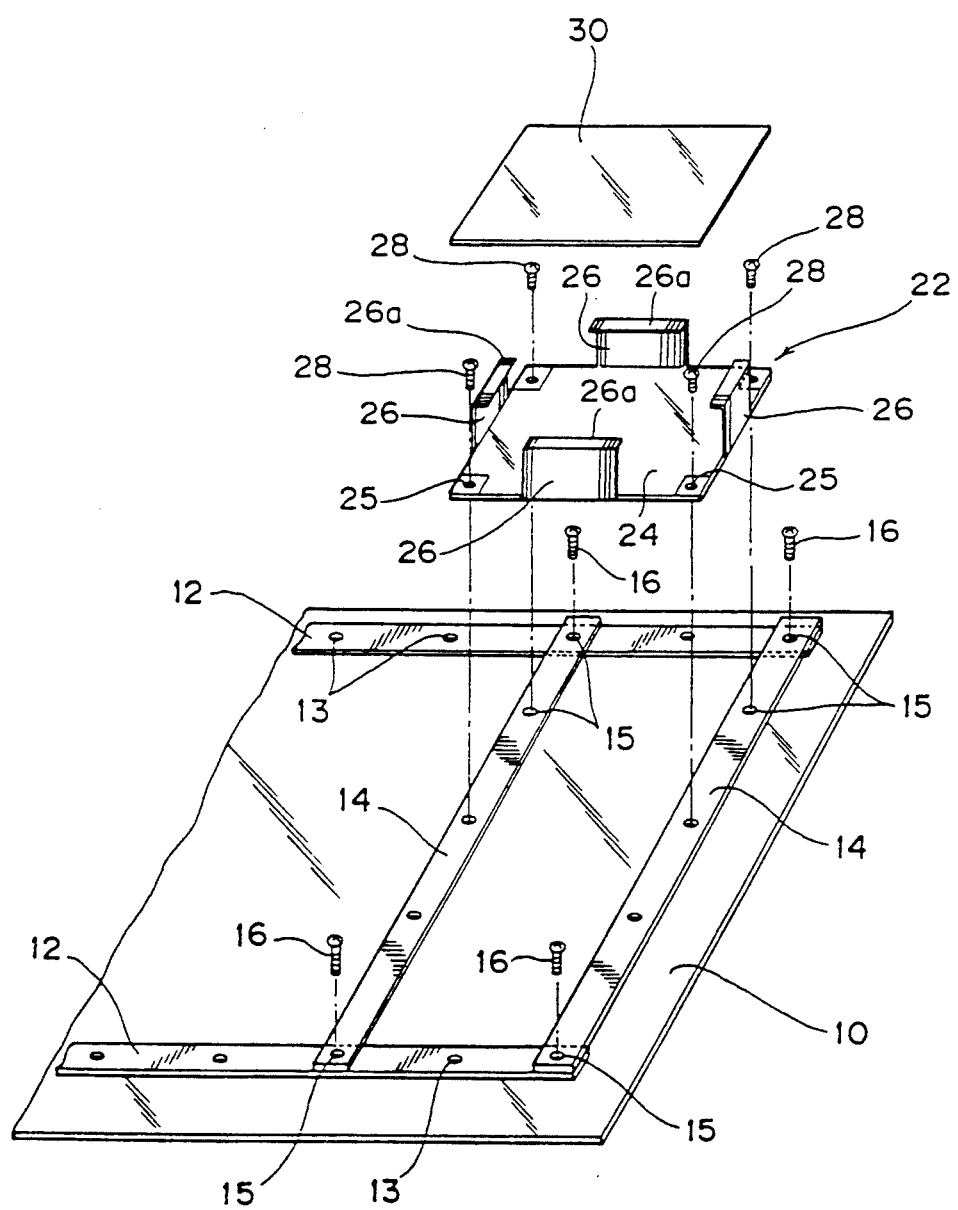
FIG. 3 is an exploded perspective view showing a state of an optical cable holding box fixed to warp-preventing second metal plates.
Figure 4:
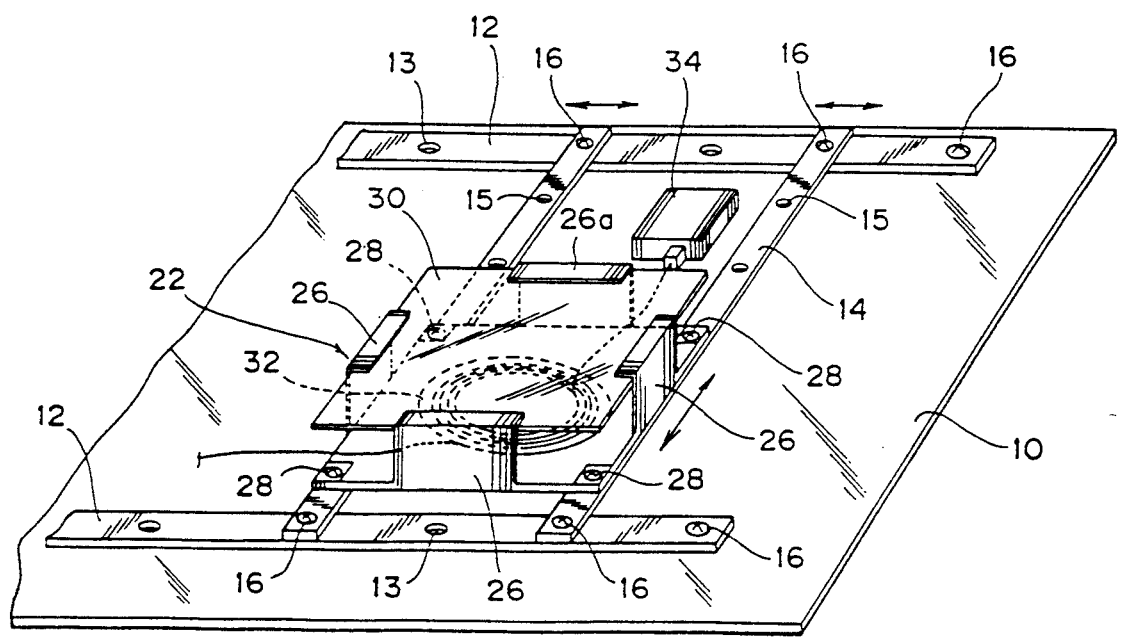
FIG. 4 is a perspective view with a portion broken away showing a state of an optical cable held in an optical cable holding box.

After the dip soldering of the printed circuit board has been finished, the second metal plates 14, spaced apart a predetermined distance, are securely fixed in appropriate positions of the first metal plates 12 with screws 16 as shown in FIG. 3 and FIG. 4. Then an optical cable holding box 22 is securely fixed in appropriate positions of the second metal plates 14 with four screws 28. The optical cable holding box 22 is structured of a bottom plate 24 and four side plates 26 formed integral with the bottom plate, and each side plate has at its upper end a bent portion 26a which is inwardly bent. The height of the optical cable holding box 22 is about 7 to 8 mm. As apparent from the drawing, the optical cable holding box 22 has openings at its four corners allowing an optical cable to pass therethrough. The bottom plate 24 is provided with four screw holes 25 formed therein.

Figure 5:
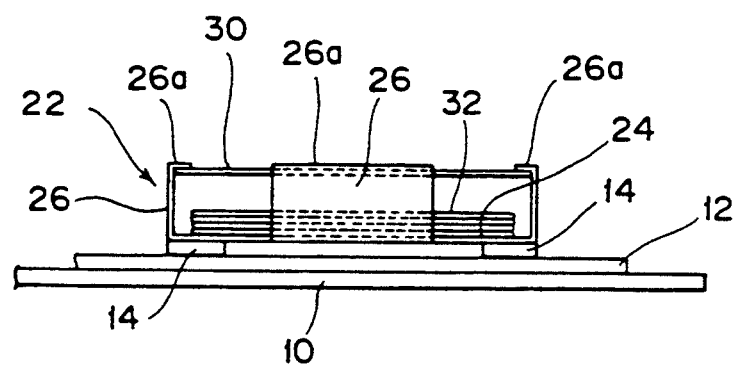
FIG. 5 is a side view showing a state of an optical cable held in an optical cable holding box.

The optical cable 32 is suitably coiled and held in the optical cable holding box 22 as shown in FIG. 4 and covered by a cover 30 of synthetic resin. Reference numeral 34 denotes an optical module mounted on the printed circuit board 10. In placing the synthetic resin cover 30 in the optical cable holding box 22, its one end is first inserted into the optical cable holding box 22 so as to engage with bent portions 26a and then the other end is inserted therein so as to engage with another bent portion 26a as shown in FIG. 5.

Since such surface mounted parts as small outline package (SOP) are about 2.7 mm high, SOPs and the like can be mounted on the printed circuit board 10 under the optical cable holding box 22 fixed onto the second metal plates 14. Further, when first and second metal plates 12 and 14 which are about 3 mm thick are employed, such parts as SOPs can be mounted just under the second metal plates 14.

According to the present invention, since warp preventing metal plates are fixed to the printed circuit board along its edge portions in X and Y directions when the parts thereon are dip soldered, warping of the printed circuit board liable to occur when it is dip soldered can be effectively prevented from occurring. Further, since the optical cable holding box is arranged to be fixed not directly to the printed circuit board but to the warp preventing second metal plates in appropriate positions, it is possible to hold the optical cable in the optical cable holding box for protection thereof in any desired position of the printed circuit board even when the mounting conditions of parts were provided or when it is difficult to obtain a place for holding the optical cable on the printed circuit board because high-density part mounting was carried out.

What is claimed is:

1. A structure for fixing an optical cable holding box to a printed circuit board comprising:
   a printed circuit board;
   a pair of extended first metal plates fixed to said printed circuit board in the vicinity of its upper and lower edge portions along said upper and lower edges, said first metal plate having a plurality of screw holes formed therein at equal spaces;
   a pair of extended second metal plates fixed to said pair of first metal plates such that they are extended between the first metal plates and spaced apart from each other, said second metal plate having a plurality of screw holes formed therein at equal spaces;
   a plurality of first screws for removably fixing said second metal plates to said first metal plates;
   an optical cable holding box fixed to said pair of second metal plates; and
   a plurality of second screws for removably fixing said optical cable holding box to said second metal plates.

2. A structure for fixing an optical cable holding box to a printed circuit board according to claim 1, wherein said optical cable holding box has openings at four corners thereof allowing an optical cable to pass therethrough.

* * * * *